(12) United States Patent
Goldman et al.

(10) Patent No.: US 7,826,599 B2
(45) Date of Patent: Nov. 2, 2010

(54) CONTROL OF A CALLING PARTY'S TELEPHONE SERVICE FEATURES BY A CALL TAKER AT A PUBLIC SAFETY ANSWERING POINT

(75) Inventors: Stuart O. Goldman, Scottsdale, AZ (US); Richard E. Krock, Naperville, IL (US); Karl F. Rauscher, Emmaus, PA (US); James P. Runyon, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1097 days.

(21) Appl. No.: 11/414,891

(22) Filed: May 1, 2006

(65) Prior Publication Data

US 2007/0263781 A1 Nov. 15, 2007

(51) Int. Cl.
*H04M 11/00* (2006.01)
(52) U.S. Cl. ...................................................... 379/45
(58) Field of Classification Search ............... 379/45, 379/37, 102.01, 203.01, 207.01
See application file for complete search history.

(56) References Cited

U.S. PATENT DOCUMENTS 5,311,569 A * 5/1994 Brozovich et al. ............ 379/45
5,448,631 A 9/1995 Cain 2005/0169439 A1 8/2005 Binning

FOREIGN PATENT DOCUMENTS

| KR | 20050031619 | 4/2005 |
| KR | 20050090819 | 9/2005 |
| WO | WO 99/59321 | 11/1999 |

OTHER PUBLICATIONS

Korean Patent Application Publication No. 2005-0031619, System and Method for Offering Urgent Call Connection Service Using Intelligent Network, Apr. 6, 2005, English translation of Abstract (1 page).
Korean Patent Application Publication No. 2005-0090819, Apparatus and Method for Delivering Emergency Call Through Contingency Plans, Sep. 14, 2005, English translation of Abstract (2 pages).

* cited by examiner

*Primary Examiner*—Stella L Woo
(74) *Attorney, Agent, or Firm*—Fay Sharpe LLP

(57) ABSTRACT

A method of administering an emergency call service in a public switched telephone network (PSTN) (60) includes: receiving a call at a switching facility (70) from an end user terminal (EUT) (52) served by the facility (70), the facility (70) providing the EUT (52) access to a telephone service feature; disabling the telephone service feature for the EUT (52) in response to the facility (70) recognizing the received call as an emergency call; routing the emergency call to a public safety answering point (PSAP) (80) serving a geographic region in which the EUT (52) is located; and, providing a call taker (84) at the PSAP (80) control over the telephone service feature, such that the call taker (84) can selectively enable the telephone service feature.

20 Claims, 1 Drawing Sheet

CONTROL OF A CALLING PARTY'S TELEPHONE SERVICE FEATURES BY A CALL TAKER AT A PUBLIC SAFETY ANSWERING POINT

FIELD

The present inventive subject matter relates to the telecommunication arts. One particular application is found in conjunction with emergency 911 telephone services, and the specification makes particular reference thereto. However, it is to be appreciated that aspects of the present inventive subject matter are also amenable to other like applications.

BACKGROUND

As is known in the art, in the public switched telephone network (PSTN), emergency 911 telephone service is implemented to connect emergency calls to a public safety answering point (PSAP). In a conventional implementation, e.g., as shown in FIG. 1, when a calling party 10 makes an emergency call (e.g., dials 911 in the United States of America or another emergency telephone number or code as may be the case in other countries), an end office (EO) 12 serving the calling party 10 recognizes the call as an emergency call, and routes the call over the PSTN 20 to a designated PSAP 30 serving the geographic area in which the calling party 10 is located. Traditionally, while the calling party 10 is engaged in the emergency call, the end office 12 also automatically blocks or disables a variety of telephone service features that are normally provided or otherwise available to the calling party 10. For example, commonly call waiting, three-way calling, B-party hold and/or other known telephone service features are disabled or suspended for the calling party 10 automatically by the end office 12 for the duration of the emergency call.

While it is generally desirable to disable selected telephone service features when a caller is engaged in an emergency call so as not to disrupt the emergency call, in some circumstances it may be beneficial or advantageous on a case by case basis to allow the caller to access and/or use one or more particular telephone service features. However, the traditional implementation of an emergency 911 service does not provide the flexibility to permit, on a case by case basis, the selective enabling of particular telephone service features during emergency 911 calls. Rather, in a traditional implementation, the designated features are typically blocked or disabled in every case for the entire duration of the emergency call, i.e., without a suitable mechanism in place to selectively re-enable particular features on a case by case basis as desired.

Accordingly, a new and improved service and/or system is disclosed that overcomes the above-referenced problems and others.

SUMMARY

In accordance with one embodiment, a method of administering an emergency call service in a public switched telephone network (PSTN) includes: receiving a call at a switching facility from an end user terminal (EUT) served by the facility, the facility providing the EUT access to a telephone service feature; disabling the telephone service feature for the EUT in response to the facility recognizing the received call as an emergency call; routing the emergency call to a public safety answering point (PSAP) serving a geographic region in which the EUT is located; and, providing a call taker at the PSAP control over the telephone service feature, such that the call taker can selectively enable the telephone service feature.

In accordance with another embodiment, a system for administering an emergency call service in a public switched telephone network (PSTN) is provided. The system includes: means for receiving a call at a switching facility from an end user terminal (EUT) served by the facility, the facility providing the EUT access to a telephone service feature; means for disabling the telephone service feature for the EUT in response to the facility recognizing the received call as an emergency call; means for routing the emergency call to a public safety answering point (PSAP) serving a geographic region in which the EUT is located; and, means for providing a call taker handling the emergency call at the PSAP control over the telephone service feature.

In accordance with another embodiment, a system for administering an emergency call service in a public switched telephone network (PSTN) includes: a switching facility operatively connected to the PSTN and an end user terminal (EUT) served by the switching facility, the facility providing the EUT access to a telephone service feature; and, a public safety answering point (PSAP) operatively connected to the PSTN and serving a geographic region in which the EUT is located. Suitably, in response to the facility recognizing a call originating from the EUT as an emergency call, the facility blocks the telephone service feature for the EUT and routes the emergency call to the PSAP where a call taker handling the emergency call is provided control over the telephone service feature.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the embodiment(s) presented herein.

Figure 1:
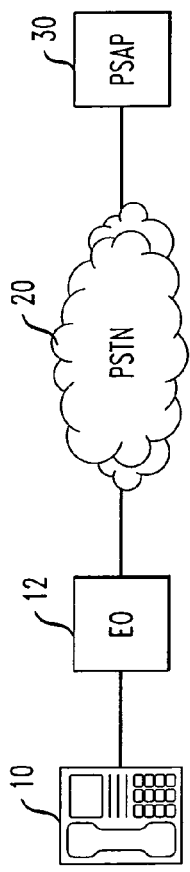
FIG. 1 is a block diagram illustrating a conventional emergency 911 service implemented in a public switch telephone network.
Figure 2:
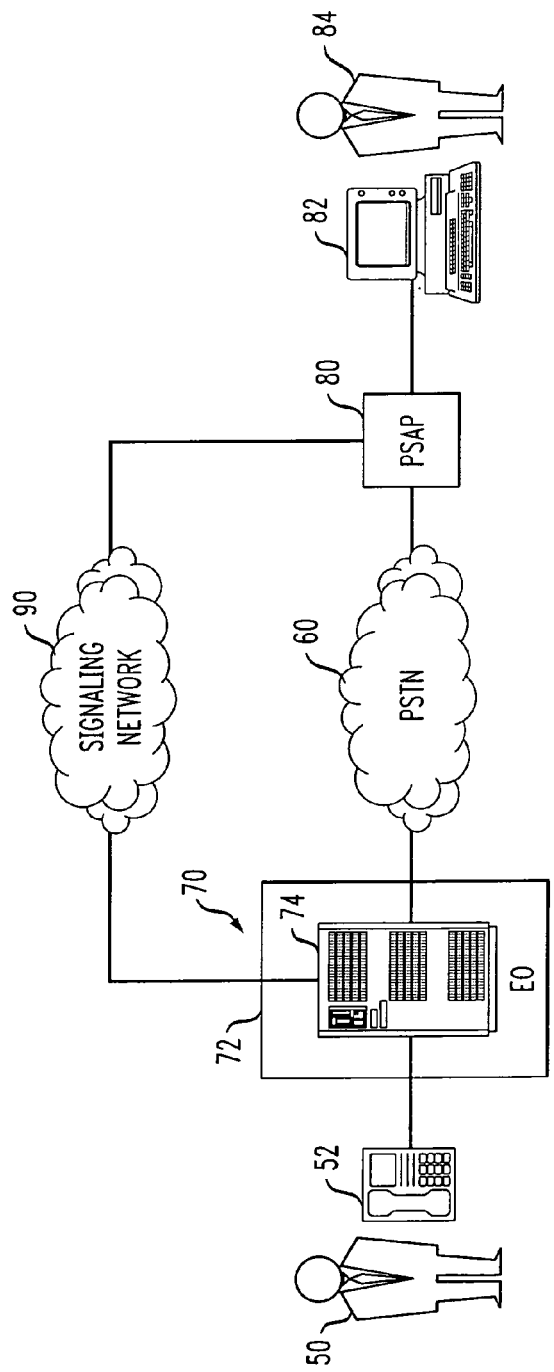
FIG. 2 is a block diagram illustrating an exemplary implementation of an emergency 911 service suitable for practicing aspects of the present inventive subject matter.

With reference to FIG. 2, a calling party 50 uses an end user terminal (EUT) 52 to selectively place or otherwise originate telephone calls over a telecommunications network A. Suitably, as shown, the originating EUT 52 is served by an originating telecommunications switching facility 70 that is operatively connected to and/or in communication with a public switched telephone network (PSTN) 60 in the usual manner. For simplicity and clarity herein, only one EUT and one switching facility are illustrated in the present example. However, it is to be appreciated that a single switching facility suitably serves a plurality of EUTs in the usual manner and that a plurality of switching facilities are similarly equipped and/or likewise arranged with respect to the PSTN 60.

As shown, the EUT 52 is optionally a landline telephone or other like end user telecommunication device or landline customer premises equipment (CPE), and the switching facility 70 serving the EUT 50 is an end office (EO) 72 that is operatively connected to the PSTN 60 in the usual manner. Suitably, the EO 72 includes a telecommunications switching device 74 (e.g., a class 5 switch such as the 5ESS or another like hard-switch or soft-switch) to which the served terminal 52 is operatively connected in the usual manner, e.g., via a twisted-pair landline cable or the like.

Alternately, in a wireless or mobile application, e.g., the switching facility 70 serving the terminal 52 is a mobile switching center (MSC) operatively connected to and/or in communication with the PSTN 60 in the usual manner. Suitably, the MSC is also operatively connected to and/or in communication with a plurality of base stations (not shown) in the usual manner. As is understood in the cellular telecommunication art, each base station (BS) provides an over-the-air radio frequency interface for its respective geographic area or cell. Selectively, the EUT 52 (which in this case is, e.g., a mobile or wireless telephone or other appropriate mobile station (MS)) is provided telecommunication services and/or otherwise accesses the network via the interface and/or the BS serving the cell in which the MS is located.

Optionally, the facility 70 includes and/or the switching device 74 is implemented as a next generation network (NGN) server. Suitably, the EUT 52 connects to the NGN server via an appropriate network connection, e.g., such as an Internet Protocol (IP) connection or the like.

In a suitable embodiment, the calling party 50 subscribes or otherwise has access to one or more known telephone service features which are normally provided and/or otherwise made available to the EUT 52 by the switching facility 70 in the usual manner. For example, theses features optionally include B-party hold, three-way calling and/or call waiting, which are normally accessed and/or employed in the usual manner. In one suitable embodiment, the switching facility 70 is also provisioned with an emergency call service or feature. Accordingly, when the EUT 52 is used to place an emergency call (e.g., by dialing 911 in the United States of America or another emergency telephone number or code as may be the case in other countries), the switching facility 70 serving the EUT 52 recognizes the call as an emergency call, and routes the call over the PSTN 60 to a designated PSAP 80 serving the geographic area in which the EUT 52 is located. Upon receiving the call, the PSAP 80 suitable routes and/or otherwise connects the call to a workstation 82 of an available PSAP operator or call taker 84. For simplicity and clarity herein, only one PSAP and one workstation are illustrated in the present example. However, it is to be appreciated that a single PSAP is suitably provisioned with a plurality of workstations in the usual manner and that a plurality of PSAPs are similarly equipped and/or likewise arranged with respect to the PSTN 60.

Optionally, in addition to routing the emergency call to the PSAP 80, the switching facility 70 also initially blocks or otherwise disables designated telephone service features that it normally provides to the calling party 50. For example, upon detecting an emergency call originating from the EUT 52, optionally, the switching facility 70 initially blocks or disables one or more of the B-party hold, three-way calling and/or call waiting features for the EUT 52. As described herein, control of these features is in turn transferred or otherwise effectively provided to the call taker 84 that received the emergency call originating from the EUT 52. Accordingly, the features can then be actively administered on a case by case basis by the call taker 84 as they see fit. For example, the call taker 84 may selectively enable or override the blocking of one or more of the features for the EUT 52 as deemed appropriate for the particular circumstances of a given emergency call, rather than simply having the complete suite of features disabled for the entire duration of the call. Moreover, for each individual call, the features can be administered and/or actively regulated by the call taker 84 differently as warranted for different circumstances surrounding the different calls.

Suitably, if the EUT 52 is engaged in an emergency call when the switching facility 70 receives and/or detects call processing signals and/or messages that would otherwise result in the accessing and/or triggering of one of the initially blocked or disable features for the EUT 52, then the switching facility 70 does not in fact automatically invoke or trigger that feature. Rather, the facility 70 in turn signals the PSAP 80 that an invocation or triggering of the particular feature is being attempted or is pending for the EUT 52 as recognized by the switching facility 70. Meanwhile, the facility 70 holds-off or delays the invocation or triggering of the feature for the EUT 52, e.g., until a response is received from the PSAP 80.

For example, the facility 70 optionally signals and/or sends an appropriate message to the PSAP 80 over a signaling network 90, thereby providing the PSAP 80 with the relevant information regarding the pending invocation or triggering of the particular feature. Optionally, the signaling network 90 may be a signaling system 7 (SS7) signaling network, an IP network such as the Internet, or another suitable signaling network to which the facility 70 and the PSAP 80 are both operatively connected. Upon receiving the signal or message from the facility 70 that the invocation or triggering of a feature is pending for the EUT 52, the PSAP 80 conveys the pertinent information to the workstation 82 of the call taker 84 handling the emergency call. Accordingly, the call taker 84 is provided the opportunity to selectively administer, regulate and/or control the handling and/or processing of the call feature as they see fit.

Optionally, the call taker 84 may deny activation of or access to the feature, or alternately, permit activation of or access to the feature on a case by case basis. For example, via their workstation 82, the call taker 84 alternately selects to deny or permit activation of or access to the feature. This selection is in turn communicated by the PSAP 80 to the facility 70, e.g., via suitable signaling and/or messages sent over the signaling network 90. Suitably, in accordance with the instructions received from the call taker 84, the facility 70 activates or provides access to the feature or alternately continues blocking the feature for the EUT 52.

Of course, there are numerous practical applications for the present inventive subject matter. By way of example, a few circumstances that particularly benefit from the present implementation of the emergency calling service shall now be discussed.

In one example, the calling party 50 may be placing an emergency call which is routed to the PSAP 80 to report a missing person. In accordance with conventional implementations of an emergency 911 service, the switching facility 70 automatically blocks or disables the call waiting feature for the EUT 52 for the entire duration that the calling party 50 is engaged in the emergency call. Accordingly, the EUT 52 is not notified of a waiting call by the switching facility 70 while the emergency call is ongoing. For many emergency calls (e.g., to report an injury or accident), it is generally undesirable to interrupt the emergency call. Accordingly, blocking the call waiting feature is generally deemed desirable, and hence the switching facility 70 in a conventional implementation is typically provisioned to automatically do so. However, in this particular instance, the waiting call, e.g., may be from a kidnapper or the missing person, in which case it may be desirable to have the call waiting feature enabled for the EUT 52. Nevertheless, with the conventional implementation, there is no way for the switching facility 70 to appreciate the nature of the emergency call ahead of time and selectively enable or disable the call waiting feature accordingly. On the other hand, with the present implementation described herein, the call taker 84 handling the emergency call presumably knows the reason for the emergency call insomuch as the calling party 50 is connected with the call taker 84 and can communicate the reason for the call to the call taker 84. Therefore, the call taker 84 can opt to instruct the switching facility 70 to permit access to and/or enable the otherwise normally disabled call waiting feature. That is to say, the call taker 84 can actively override the switching facility's default practice of blocking the call waiting feature. However, if the nature of the emergency call did not warrant enablement of the call waiting feature, then the call taker 84 may opt to instruct the switching facility 70 to continue blocking the call waiting feature and not have the emergency call interrupted. Notably, with the present implementation, control of the feature resides with the call taker 84 at the PSAP 80 and it can be selectively enabled on a case by case basis as the call taker 84 sees fit.

In another example, the calling party 50 may first place an emergency call which is connected to the PSAP 80 to report a medical emergency, and then wish to add a third party to the call, such the calling party's physician or other individual that is aware of any medical conditions or special considerations that should be taken in to account. Again, for many emergency calls, it is generally desirable that the call not be interrupted. Accordingly, with conventional implementations of an emergency 911 service, the switching facility 70 automatically blocks or disables the three-way calling feature for the EUT 52 for the entire duration that the calling party 50 is engaged in the emergency call. However, in this particular instance, it may be desirable to have the three-way calling feature enabled for the EUT 52. Nevertheless, with the conventional implementation, there is no way for the switching facility 70 to appreciate the nature of the emergency call ahead of time and selectively enable or disable the three-way calling feature accordingly. On the other hand, with the present implementation described herein, the call taker 84 handling the emergency call presumably knows the reason for the emergency call insomuch as the calling party 50 is connected with the call taker 84 and can communicate the reason for the call to the call taker 84. Therefore, the call taker 84 can opt to instruct the switching facility 70 to permit access to and/or enable the otherwise normally disabled three-way calling feature. That is to say, the call taker 84 can actively override the switching facility's default practice of blocking the three-way calling feature. However, if the nature of the emergency call did not warrant enablement of the three-way calling feature, then the call taker 84 may opt to instruct the switching facility 70 to continue blocking the three-way calling feature and not have the emergency call interrupted. Notably, with the present implementation, control of the feature resides with the call taker 84 at the PSAP 80 and it can be selectively enabled on a case by case basis as the call taker 84 sees fit.

In one suitable embodiment, control of the particular telephone service features is not only provided to the caller taker 84, but the PSAP 80 is also utilized as a call bridging control point and/or hub.

For example, in a call waiting situation, if a call is received by the switching facility 70 for the EUT 52 while the calling party 50 is engaged in an emergency call connected to the PSAP 80, then the switching facility 70 does not provide a call waiting indication or tone to the EUT 52. Rather, the received call is forwarded or rerouted to the PSAP 80, and the workstation 82 of the call taker 84 handling the emergency call is notified of the incoming call. Accordingly, the call taker 84 is provided the option of joining or bridging the waiting call with or to the emergency call session already in progress between the call taker 84 and the calling party 50. Suitably, so as to not disrupt the emergency call, the calling party 50 is not placed on hold while the waiting call is answered by the call taker 84. Rather, upon the call taker 84 accepting the waiting call, it is immediately bridged or joined to the emergency call.

In another example, if the calling party 50 desired to add a third party to an emergency call already connected to the PSAP 80, then they would employ the EUT 52 to signal the switching facility 70 in the normal manner to utilize the three-way calling feature, e.g., by performing a hook flash or the like and dialing or otherwise entering a desired telephone number or other address. However, rather than merely blocking the request as is done in a convention implementation, the switching facility 70 captures the request and sends it to the PSAP 80, e.g., over the signaling network 90. This is then decoded at the PSAP 80 and provided to the workstation 82 of the call taker 84 handling the emergency call for the calling party 50. Accordingly, the call taker 84 is provided the option to permit or block the third party call. Suitably, the request for the three-way call is first accepted or denied, then if the request is accepted, the calling party 50 dials or enters the third party's telephone number or address in the normal way, e.g., by dialing individual digits, selecting a programmed speed dial button, etc. The entered telephone number or address is likewise captured by the facility 70. However, rather than establishing a new leg to the entered telephone number or address, the facility 70 sends the captured telephone number or address to the PSAP 80, e.g., over the signaling network 90. This is then decoded at the PSAP 80 and provided to the workstation 82 of the call taker 84 handling the emergency call for the calling party 50. If the call taker 84 opts to permit the three-way call, a third call leg is established between the PSAP 80 and the third party, and this third leg is joined or bridged at the PSAP 80 to the emergency call already in progress between the calling party 50 and the call taker 84. Suitably, so as to not disrupt the emergency call, the calling party 50 is not placed on hold while the third party call is being placed. Rather, upon the call taker 84 permitting the three-way call, the third leg is established and immediately bridged or joined to the emergency call. Optionally, the PSAP 80 is provisioned to allow the call taker 84 to directly dial the third party leg for the call, or alternately, to extend dial tone to the calling party 50 and allow them to dial through the PSAP 80.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for administering an emergency call service in a public switched telephone network (PSTN), said method comprising:
   (a) receiving a call at a switching facility from an end user terminal (EUT) served by the facility, said facility providing the EUT access to a telephone service feature;
   (b) disabling the telephone service feature for the EUT in response to the facility recognizing the received call as an emergency call;
   (c) routing the emergency call to a public safety answering point (PSAP) serving a geographic region in which the EUT is located; and,
   (d) providing a call taker handling the emergency call at the PSAP control over the telephone service feature to selectively enable the telephone service feature for activation by the EUT.

2. The method of claim 1, wherein step (d) comprises:
   sending a notification signal or message from the facility to the PSAP when the facility detects a call processing signal or message that would otherwise trigger the telephone service feature.

3. The method of claim 2, wherein step (d) further comprises:
   sending a response to the notification signal or message from the PSAP to the facility, said response providing instructions to the facility to either continue blocking the telephone service feature for the EUT or to enable the telephone service feature for the EUT according to a selection made by the call taker.

4. The method of claim 1, wherein the telephone service feature is call waiting.

5. The method of claim 4, further comprising:
   receiving a third party call at the facility for the EUT while the EUT is engaged in the emergency call;
   forwarding the third party call to the PSAP;
   notifying the call taker of the waiting third party call; and,
   allowing the call taker to selectively bridge the third party call to the emergency call.

6. The method of claim 1, wherein the telephone service feature is three-way calling.

7. The method of claim 6, further comprising:
   receiving signaling at the facility from the EUT attempting to invoke the three-way calling feature;
   capturing an entered telephone number received from the EUT in connection with the attempted invocation of the three-way calling feature;
   forwarding the captured number from the facility to the PSAP;
   notifying the call taker of an attempt to establish a three-way call and providing the call taker the captured number; and,
   allowing the call taker to selectively establish a third party call to the captured number and bridge the third party call to the emergency call.

8. The method set forth in claim 1, further comprising:
   (e) receiving a request signal or message from the EUT at the switching facility for activation of the telephone service feature during the emergency call;
   (f) delaying invocation of the telephone service feature at the switching facility; and
   (g) sending a notification signal or message from the switching facility to the PSAP indicating the telephone service feature was requested by the EUT.

9. The method set forth in claim 8, further comprising:
   (h) receiving a response signal or message from the PSAP at the switching facility in response to selective control over the telephone service feature by the call taker at the PSAP; and
   (i) denying or invoking the telephone service feature for the EUT from the switching facility during the emergency call based at least in part on the response signal or message received in (h).

10. A system for administering an emergency call service in a public switched telephone network (PSTN), said system comprising:
    means for receiving a call at a switching facility from an end user terminal (EUT) served by the facility, said facility providing the EUT access to a telephone service feature;
    means for disabling the telephone service feature for the EUT in response to the facility recognizing the received call as an emergency call;
    means for routing the emergency call to a public safety answering point (PSAP) serving a geographic region in which the EUT is located; and,
    means for providing a call taker handling the emergency call at the PSAP control over the telephone service feature to selectively enable the telephone service feature for activation b the EUT.

11. The system of claim 10, further comprising:
    means for sending a notification signal or message from the facility to the PSAP when the facility detects a call processing signal or message that would otherwise trigger the telephone service feature.

12. The system of claim 11, further comprising:
    means for sending a response to the notification signal or message from the PSAP to the facility, said response providing instructions to the facility to either continue blocking the telephone service feature for the EUT or to enable the telephone service feature for the EUT according to a selection made by the call taker.

13. The system of claim 10, wherein the telephone service feature is call waiting.

14. The system of claim 13, further comprising:
    means for receiving a third party call at the facility for the EUT while the EUT is engaged in the emergency call;
    means for forwarding the third party call to the PSAP;

means for notifying the call taker of the waiting third party call; and, means for allowing the call taker to selectively bridge the third party call to the emergency call.

15. The system of claim 10, wherein the telephone service feature is three-way calling.

16. The system of claim 15, further comprising:

means for receiving signaling at the facility from the EUT attempting to invoke the three-way calling feature;

means for capturing an entered telephone number received from the EUT in connection with the attempted invocation of the three-way calling feature;

means for forwarding the captured number from the facility to the PSAP;

means for notifying the call taker of an attempt to establish a three-way call and providing the call taker the captured number; and, means for allowing the call taker to selectively establish a third party call to the captured number and bridge the third party call to the emergency call.

17. A system for administering an emergency call service in a public switched telephone network (PSTN), said system comprising:

a switching facility operatively connected to the PSTN and an end user terminal (EUT) served by the switching facility, said facility providing the EUT access to a telephone service feature; and, a public safety answering point (PSAP) operatively connected to the PSTN and serving a geographic region in which the EUT is located;

wherein, in response to the facility recognizing a call originating from the EUT as an emergency call, the facility blocks the telephone service feature for the EUT and routes the emergency call to the PSAP where a call taker handling the emergency call is provided control over the telephone service feature to selectively unblock the telephone service feature to enable activation by the EUT.

18. The system of claim 17, wherein the telephone service feature is one of call waiting, three-way calling or B-party hold.

19. The system of claim 17, wherein the switching facility is an end office (EO) equipped with one of a telecommunications switch and a next generation network server.

20. The system of claim 17, wherein the switching facility is a mobile switching center (MSC).

* * * * *